United States Patent [19]

Osterwald

[11] Patent Number: 4,969,852

[45] Date of Patent: Nov. 13, 1990

[54] CHANNEL DISCRIMINATOR CIRCUIT FOR PAGING STATIONS

[75] Inventor: Ray W. Osterwald, Lakewood, Colo.

[73] Assignee: Public Service Company of Colorado, Denver, Colo.

[21] Appl. No.: 406,557

[22] Filed: Sep. 13, 1989

[51] Int. Cl.⁵ .............................................. H04B 1/10
[52] U.S. Cl. .................................... 455/212; 455/214; 455/221; 455/222
[58] Field of Search ............... 455/212, 214, 218, 221, 455/222, 223, 336; 375/104; 307/231

[56] References Cited

U.S. PATENT DOCUMENTS

| 2,932,729 | 1/1954 | Yamato et al. | 455/58 |
| 3,456,252 | 7/1969 | Pantos | 455/58 |
| 3,757,100 | 9/1973 | Coleman | 307/231 |
| 3,851,253 | 11/1974 | Eastmond | 455/212 |
| 4,020,421 | 4/1977 | Elder et al. | 455/212 |
| 4,060,735 | 11/1977 | Pascucci et al. | 340/310 A |
| 4,288,876 | 9/1981 | Lennox et al. | 455/214 |
| 4,412,347 | 10/1983 | Lipcon | 455/58 |
| 4,519,074 | 5/1985 | Basile | 455/58 |
| 4,620,312 | 10/1986 | Yamashita | 375/104 |
| 4,718,059 | 1/1988 | Szwaga et al. | 370/85.1 |
| 4,731,868 | 3/1988 | Dreier | 455/222 |

Primary Examiner—Reinhard J. Eisenzopf
Assistant Examiner—Lisa Charouel
Attorney, Agent, or Firm—John E. Reilly

[57] ABSTRACT

A channel discriminator circuit is specifically adaptable for use in association with a radio receiver in which DC voltage signals are generated which are proportional to the FM signals received by the radio receiver and an inhibit circuit will generate an inhibit signal denoting the reception of FM signals above a predetermined detection threshold corresponding to an assigned carrier frequency. The channel discriminator circuit will determine whether the FM signals received are centered within a predetermined band width corresponding to the assigned carrier frequency by comparing the DC voltage signal generated with upper and lower reference voltage limits generated by a potentiometer network and will cause the inhibit circuit to generate an inhibit signal only if the DC voltage representing the FM signal received is within the predetermined limits established by the potentiometer network.

11 Claims, 3 Drawing Sheets

TRUTH TABLE FOR UI

| B | C | D |
|---|---|---|
| L | L | L |
| H | L | H |
| H | H | H |
| L | H | H |

CHANNEL DISCRIMINATOR CIRCUIT FOR PAGING STATIONS

This invention relates to a novel and improved channel discriminator circuit which is adaptable for use with paging transmitters having FM radio receivers but has further useful application in controlling circuits, such as, digital filtering circuits, diode attenuators and the like which require differentiation between noise and valid signals in the radio environment.

BACKGROUND AND FIELD OF THE INVENTION

It is customary to employ belt pagers and paging stations at remote sites or zones to communicate with personnel in the field for the purpose of transmitting information between a central office or terminal and each employee. Typically, each paging station includes an FM receiver and an inhibit circuit including an inhibit relay which is energized anytime a signal level is received above a selected detection threshold which will cause the relay to be energized and generate an inhibit signal. If, for instance, a paging computer terminal at the central office wishes to follow a command to deliver a message to an employee via the paging system, it will look first to determine if an inhibit is present in the employee's zone. If the inhibit is present, it follows its programming and skips the first zone, goes to the second zone and looks for an inhibit. If the inhibit signal had not been present in the first zone, then the next step would have been for the computer to send a command to turn on the remote radio transmitter and, after a slight delay, the actual data message is sent from the paging computer terminal.

The data message is supplied to the paging radio transmitter input circuitry, modulates the carrier frequency, then is applied to the antenna lead to the station antenna and transmitted to the employee's belt pager. The radio frequency of the radio paging transmitter and the employee's pager are the same. Thus, the belt pager will emit an alert tone whereupon the employee presses a button on the pager to read the message.

A problem associated with existing inhibit circuits is in discriminating between a valid radio signal received within a specific band width assigned to a receiver and one in an adjacent channel as well as noise or other interference and which may tend to overlap the assigned channel thereby causing the inhibit relay to be accidentally closed.

Representative patents in this area are U.S. Pat. Nos. 2,932,729 to S. Yamato et al; 3,456,252 to A. J. Pantos; 4,412,347 to J. B. Lipcon; 4,519,074 to P. C. Basile and 4,718,059 to B. Sqzga et al. Although these patents generally may be directed to inhibit circuitry to prevent reception of more than one signal at a time, none is designed to be used in FM radio receivers and specifically in such a way as to be capable of discriminating between noise and valid signals within a specific assigned frequency band or band width. In the past, crystal filters have been utilized between the antenna and FM receiver to differentiate between signals and assure that the signal is within a particular frequency band. Nevertheless, crystal filters are quite expensive and do not always afford the desired performance, particularly in the filter shape factor and response time when utilized in association with paging transmitters of the type described. Again, it is of particular importance that the inhibit circuit be so controlled as to be capable of discriminating between valid signals received within the band width assigned to its receiver and those of adjacent channels.

SUMMARY OF THE INVENTION

Accordingly, it is an object of the present invention to provide for a novel and improved channel discriminator for use in telecommunication systems and which is specifically adaptable for use in paging networks to eliminate interference in FM radio receivers.

It is another object of the present invention to provide for a novel and improved channel discriminator which will prevent excessive inhibits from occurring in a paging network due to noise or other interference and which is further conformable for use in various control circuits, such as, digital filtering circuits and high performance diode attenuators which require differentiation between noise and valid signals in the radio environment.

A further object of the present invention is to provide for a novel and improved channel discriminator circuit which can be interfaced with conventional inhibit circuitry to control response of the inhibit circuitry to valid and invalid signals in a rapid and efficient manner.

An additional object of the present invention is to provide in a paging transmitter for a channel discriminator device employed in association with an inhibit circuit and wherein operational amplifiers are utilized in association with a voltage regulator to establish narrowly defined window limits so that the inhibit circuit will be activated only in response to reception of a valid signal within those limits.

In accordance with the present invention, a preferred form of channel discriminator circuit is provided for a radio receiver having receiver means for receiving FM signals transmitted from another source and wherein means are provided for generating a DC voltage signal proportional to the FM signals received and inhibit circuit means includes means which when energized will generate an inhibit signal denoting the reception of FM signals by the receiver means above a predetermined detection threshold corresponding to an assigned carrier frequency, the improvement comprising means for determining whether the FM signals received are centered within a predetermined band width corresponding to the assigned carrier frequency including amplifier means for receiving the voltage signal and for generating an output voltage if the DC voltage signal is within predetermined voltage limits, amplifier control means including voltage regulators for determining upper and lower voltage limits of the amplifier means corresponding to the predetermined band width in response to which an output signal is generated by the amplifier means, and latch means is responsive to an output signal from the amplifier means to deliver a signal energizing the inhibit signal-generating means whereby to generate an inhibit signal.

Preferably, the amplifier means is defined by a pair of operational amplifiers formed into an open-loop comparator for determining whether the DC voltage signal proportional to the FM signals is within the predetermined bandwidth as established by reference voltages from the amplifier control means; and the amplifier control means is a potentiometer network which will establish selected reference voltages.

The above and other objects, advantages and features of the present invention will become more readily appreciated and understood from a consideration of the following detailed description of preferred and modified forms of the present invention when taken together with the accompanying drawings in which:

DETAILED DESCRIPTION OF THE PREFERRED EMBODIMENT

Figure 1:
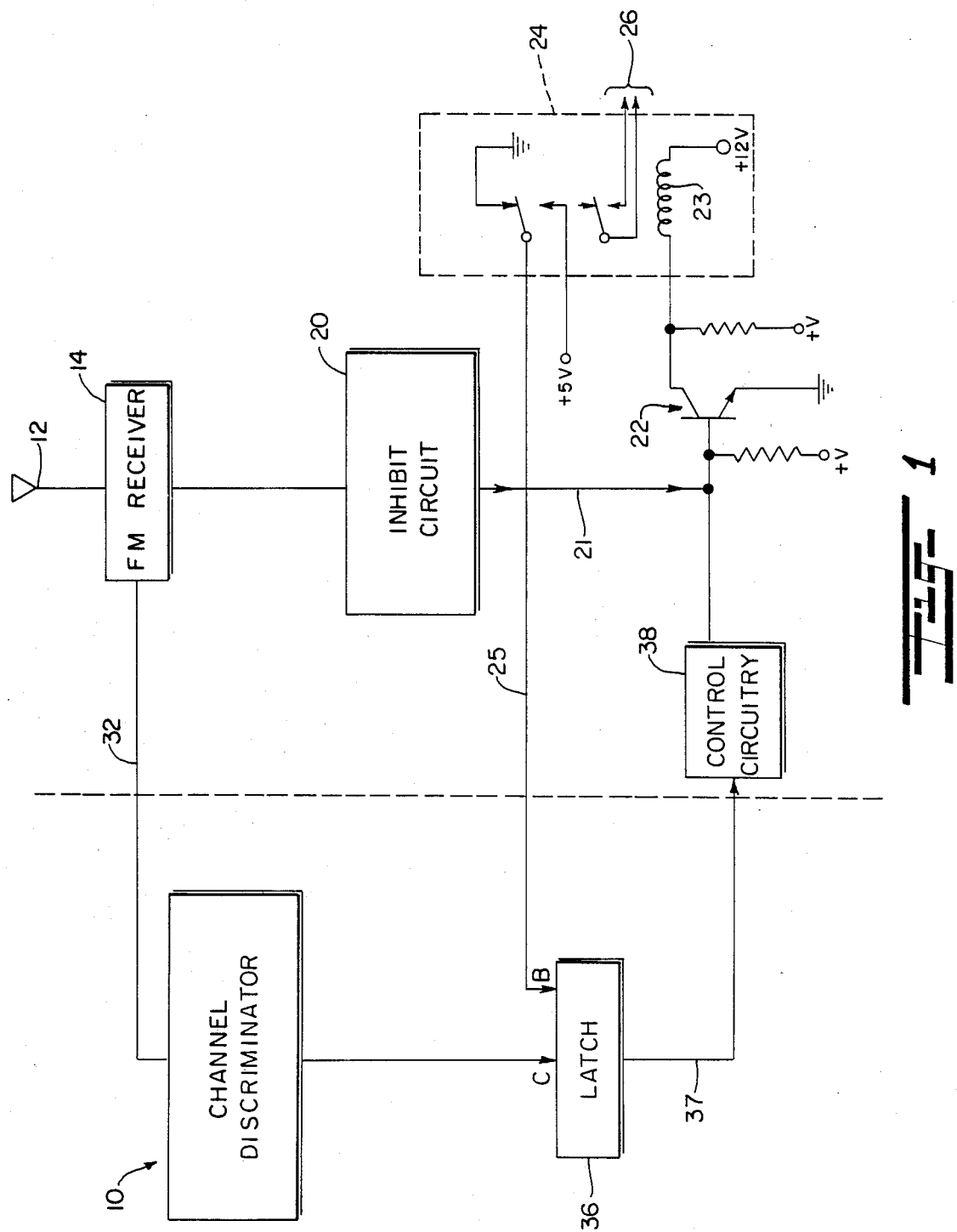
FIG. 1 is a block diagram of a preferred form of channel discriminator circuit employed in association with an FM radio receiver and inhibit circuit in accordance with the present invention.

Referring in more detail to the drawings, there is shown by way of illustrative example in FIG. 1 a preferred form of channel discriminator circuit 10 employed in association with a paging station antenna 12 which is intended to receive signals transmitted by a paging computer terminal, not shown, and to direct those signals into an FM receiver 14. In a well-known manner, the signals directed into the receiver 14 are applied through suitable control circuitry into a conventional inhibit circuit 20 which forms a part of a standard squelch gate card Model No. TLN4662A manufactured and sold by Motorola, Inc. of Chicago, Ill. A portion of that inhibit circuit 20 includes an output line 21 extending into the input of a transistor switch 22 which is connected to the coil 23 of relay 24. One closure of the relay has an output 26 intended to transmit a signal to a terminal, not shown, and another relay contact is connected to a return line 25 which when the relay is closed will transmit a closure signal at input B to a latch 36 of the present invention in a manner to be hereinafter described. Briefly, however, if the received FM signal level is above a specified detection threshold, the inhibit circuit 20 will operate through the relay coil 23 to close the relays 24, unless the discriminator circuit 10 determines that the signal received is not valid and in which case it prevents the inhibit relay from being closed by the signal received over output line 21 through the inhibit circuit 20.

In order to determine whether the received signal is valid, the channel discriminator of the present invention as broadly designated at 10 receives a DC voltage over line 32 from the receiver 14 which is proportional to the FM signal and determines whether that signal is centered within the FM receiver passband assigned to the transmitter. For example, the FCC may assign a carrier frequency of 154 MHz with a permissible width of ±2.5 KHz, and it is a function of the channel discriminator 10 to determine whether the signals received are within the precisely defined limits established above and below the assigned frequency. If the signal falls within those limits, an output signal is delivered via switches 68 and 69 to input C of the latch 36. The latch 36 also receives a signal from the relay 24 via line 25 indicating whether a signal has been received through the inhibit circuit. If both inputs B and C are high to the latch 36, a signal is delivered over the output line 37 into suitable control circuitry 38 which also is a part of the squelch card to cause the relay coil 23 to be energized by the signal received via line 21 from the receiver 14.

If the FM signal from the receiver 14 is outside the limits established in the discriminator circuit 10, the output to the latch 36 is held low and, irrespective of the nature or force of the signal applied to the inhibit circuit, the circuit 38 will prevent the latter signal from activating the relay coil 23.

Figure 2:
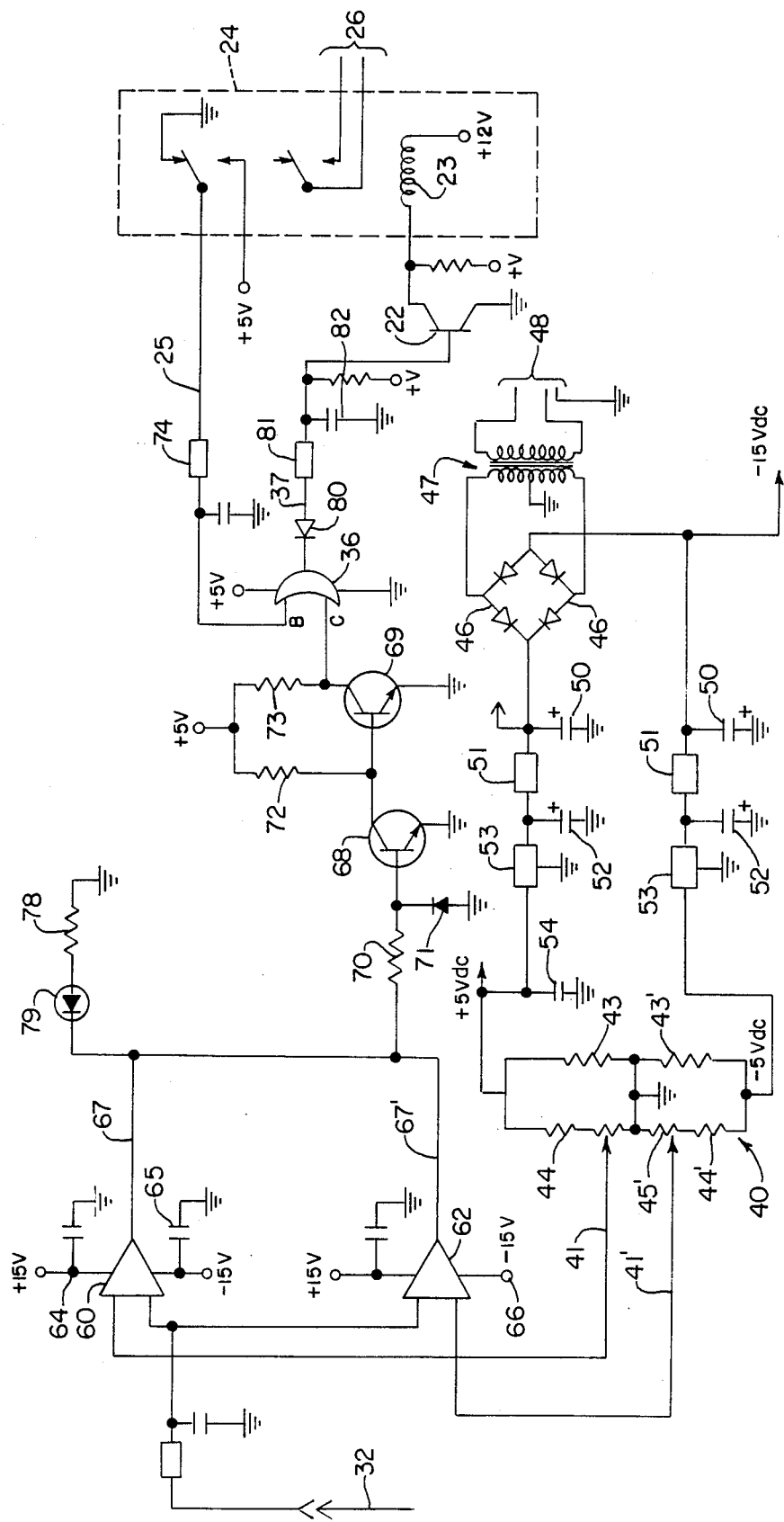
FIG. 2 is a schematic diagram of a preferred form of channel discriminator circuit illustrated in FIG. 1.

A preferred form of discriminator circuit 10 is illustrated in FIG. 2 in which a potentiometer network 40 establishes upper and lower voltage limits to define a pass band in which a signal must be received in order to be valid. To this end, the potentiometer network has an upper limit contact arm or slider 41 which is adjusted or set with respect to a first series of resistors 43, 44 and 45 with a 5 volt potential at one end; and a lower limit contact arm or slider 41' is adjusted with respect to a second series of resistors 43', 44' and 45' and which has a −5 volt potential at one end. Each side of the network is connected to opposite ends of a diode bridge 46, and a transformer 47 is connected to an alternating current power source 48 to step down the voltage and apply across the diode bridge 46. Each side of the network correspondingly includes grounded capacitors 50 and 52 separated by a ferrite bead 51 and positive and negative fixed voltage regulators 53. In addition, a grounded capacitor 54 is connected to the 5 VDC source on the upper limit side as shown, and the upper limit capacitor 50 is connected to the 15 VDC source. For the purpose of illustration but not limitation, the power source 48 may be a 117 VAC source; capacitors 50 are 100 uf; capacitors 52 and 54 are 0.33 uf; resistors 43 are 4.7 K ohms; resistors 44 are 10 K ohms; resistors 45 are 10 K ohms, ten turns. Voltage regulator 53 is SK3462 on the positive upper limit side and SK9219 on the negative lower limit side; the diode bridge 47 is an SK3105; transformer 47 is a Stancor DSW-216 to step down the voltage from 117 VAC to 15 VDC.

The potentiometer network 40 as described 20 is specifically designed to establish a passband of +2.5 khz; i.e., the upper limit is +2.5 khz and the lower limit is −2.5 khz for an assigned carrier frequency of 154 MHz. The contact arm 41 is connected to one input side of operational amplifier 60, and arm 41' is connected to an input side of operational amplifier 62. The voltage signal applied over line 32 from the FM receiver 14 is directed to the opposite input sides of each of the respective amplifiers 60 and 62. The amplifiers 60, 62 are interconnected to form a window comparator which is operated in an open-loop configuration so that the voltage required to change from one state to another is very small once the threshold is reached. The 15 VDC source is connected to grounded capacitor input 64 for each of the respective amplifiers 60 and 62; additionally, the amplifier 60 has a −15 VDC connection to grounded capacitor 65 but the amplifier 16 has a −15 volt connection as at 66 without a grounded capacitor in that line.

If the received signal over line 32 falls within the limits established by the comparator, output signals are then directed over lines 67 and 67', respectively, to transistorized switches or isolators 68 and 69. A resistor 70 and diode 71 are connected in series to the input side of the switch 68; and resistors 72 and 73 having a 5 VDC input are connected across the switch 69. Each of the switches 68 and 69 is an NPN switch and will serve to isolate the latch 36 from the outputs of the amplifiers 60 and 62. The collector side of the switch 68 is normally low and the collector side of switch 69 is normally high and connected into one input of the latch 36. The other input of latch 36 is connected as earlier noted via line 25 to the relay 24, and a ferrite bead 74 and grounded capacitor 75 are connected in the line 25. A resistor 78 and indicator light or LED display 79 are connected to the comparator output line 67 for the purpose of indicating that an invalid signal has been received and which typically may occur as a result of adjacent channel activity.

Again, the output 37 from the latch 36 is connected to the input of transistor 22 which has one side connected to relay coil 23. The Control Circuit 38 referred to earlier includes a diode 80, ferrite bead 81 and grounded capacitor 82 in the line 37 leading into the transistor switch 22.

Figure 3:
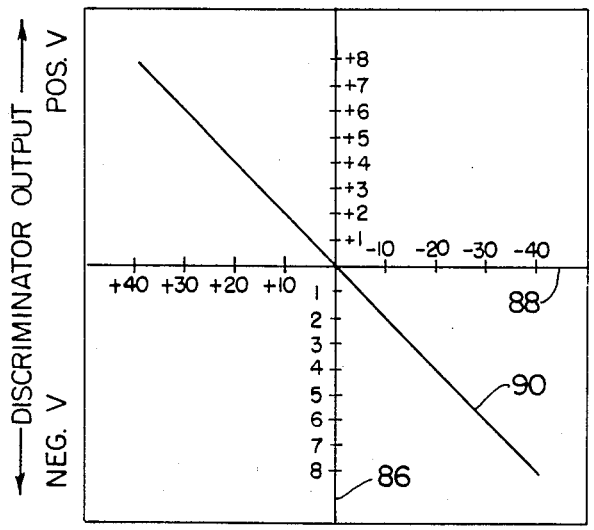
FIG. 3 is a graph illustrating the relationship between input frequency and output voltage.

Referring to FIG. 3, there is illustrated the linear relationship between the input frequency of an FM signal received at the receiver 14 and the voltage signal which is delivered into the comparator inputs 32 of the channel discriminator circuit 10. Thus, the comparator input is essentially a linear voltage as represented by the diagonal line through the center of the graph of FIG. 3, the center of the graph representing an FM radio signal exactly in the center of the receiver's band width or pass band. Thus, the vertical line 86 in the graph of FIG. 3 represents the center of the RF passband for the receiver 14, the frequencies of the received signal increasing in a positive direction to the right of the center line 86 and in a negative direction to the left of the center line 86. Positive and negative voltages of the signal input from the receiver 14 into the discriminator circuit 10 increase in a positive direction above horizontal line 88 and in a negative direction below that line. Accordingly, the voltage can be determined by extending an imaginary line from the frequency level in an upward direction for a positive frequency and in a downward direction for a negative frequency until it intersects the diagonal output line 90 at which point an imaginary line is extended in a horizontal direction over to the center line 86 to obtain a reading of the voltage level produced.

Figure 5:
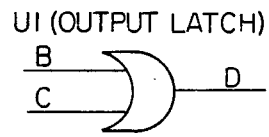
FIG. 5 is a truth table for the output latch employed in the discriminator circuit of the present invention.
Figure 4:
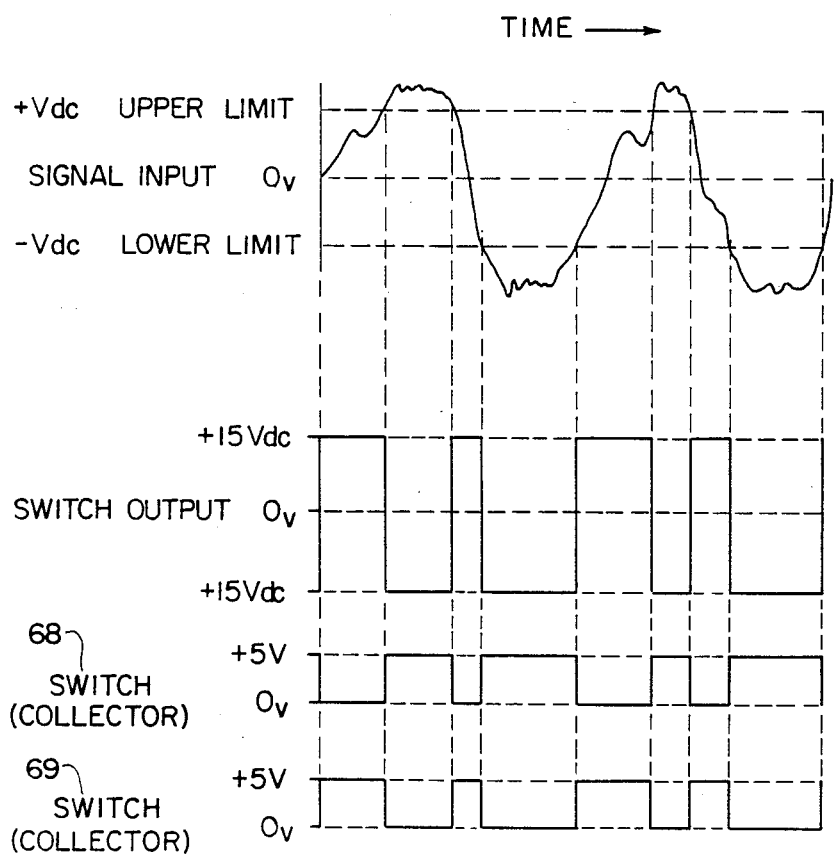
FIG. 4 is a chart of signal timing for a preferred form of channel discriminator circuit.

FIG. 4 illustrates the variation in voltage of the signal applied over line 32 from the receiver 14 and its relationship with respect to the upper and lower limits established by the potentiometer network with respect to time. The timing chart further indicates the change in the state of the comparator output between a high condition H and low condition L as the FM signal over line 32 varies between a value within the upper and lower limits and one outside of those limits; also, the timing chart indicates the high and low conditions on the collector side of the switches 68 and 69. As noted from the truth table of FIG. 5 for the latch 36, the output signal from the collector side of the switch 69 is the input C to the latch 36, and the return signal from relay 24 over line 25 is delivered to input B. As long as the relay 24 is open, input B will be low (L). If input C is also low (L), the output of the latch 36 is also low thereby indicating the absence of a valid signal. On the other hand, whenever the FM signal is within the limits of the potentiometer network, the collector side of the switch 69 goes high (H) so that input C is high (H) and the output signal D is high (H) and the signal delivered through the inhibit circuit 20, line 21 and into switch 22 is free to energize the relay coil 23. Otherwise, if the signal output at D is low as applied over line 37 to the Control Circuit 38 it will prevent the signal delivered by the circuit 20 from activating the inhibit relay 24. As a practical matter, the only two conditions which should occur are those in which both inputs to the latch 36 are either high or low, since the inhibit relay 24 will be closed to generate a return signal over line 25 only when the received signal is within the upper and lower limits established by the potentiometer network.

The advantages and features of the discriminator circuit of the present invention may be better appreciated by understanding its use in association with FM receiver circuits for a series of paging transmitters at widely separated or remote sites or locations. For instance, if a paging transmitter is assigned a given frequency for each zone and is intended to transmit signals from a central computer terminal to a series of belt pagers in that zone, the channel discriminator 10 at each paging transmitter will be capable of distinguishing between valid signals and noise or other interference. Thus, the inhibit relay 24 will be activated only in the presence of a valid signal to prevent reception of other signals at the same time. As a practical matter, whenever the relay 24 is closed, it will direct a signal over inhibit closure lines 26' to the terminal so that the terminal will know that the paging station receiver in the particular zone is receiving valid signals. This is important where, for example, the terminal is delivering signals to selected zones but these signals are being received in other zones so that the paging transmitters are not in a condition to receive the other signals at that time. Accordingly, the terminal will defer transmission of signals to those other zones until the inhibit relay or relays are open indicating that they are clear to receive valid signals.

It will be appreciated that the channel discriminator circuit as described for use in conjunction with a squelch gate card and specifically the inhibit circuitry thereof is nevertheless readily adaptable for use with other inhibit circuits and particularly in association with FM radio receivers. Moreover, the circuit of the present invention is conformable for various other applications, for example, digital filter circuits and diode attenuators as well as other circuitry which requires differentiation between noise and valid signals.

It is therefore to be understood from the foregoing that various modifications and changes may be made in the construction and arrangement of elements comprising the present invention without departing from the spirit and scope of the present invention as defined by the appended claims and reasonable equivalents thereof.

I claim:

1. In a radio receiver having receiver means for receiving FM signals transmitted from another source and for generating a DC voltage proportional to said FM signals received, and inhibit circuit means including means which when energized will generate an inhibit signal denoting reception of signals by said receiver means above a predetermined detection threshold corresponding to an assigned carrier frequency, the improvement comprising:

channel discriminator means for determining whether said FM signals are centered within a predetermined bandwidth corresponding to the assigned carrier frequency including limit control means for generating reference voltages representing the upper and lower limits of said bandwidth, and comparator means for receiving said DC voltage from said receiver means and for generating an output signal if said DC voltage level falls within the upper and lower limits of said reference voltages; and means responsive to each said output signal from said comparator means to cause energization of said inhibit signal-generating means.

2. In a radio receiver according to claim 1, said last named means defined by a latching circuit including a first input from said comparator means and a second input from said inhibit circuit means for reception of input signals from said comparator means and said inhibit circuit means.

3. In a radio receiver according to claim 1, said comparator means having a pair of operational amplifiers interconnected in the form of an open-loop comparator circuit.

4. In a radio receiver according to claim 1, said limit control means having a pair of voltage regulators for generating positive and negative reference voltages defining said upper and lower limits of said bandwidth.

5. In a radio receiver according to claim 4, said limit control means including a potentiometer network for adjusting the reference voltages generated by said voltage regulators.

6. In a radio receiver according to claim 1, said last named means defined by an OR gate, and switch means isolating said OR gate from said comparator means.

7. In a control circuit for comparing the frequency of an FM signal received with an assigned frequency wherein the received signals are converted into Dc voltages proportional to the received signals, a voltage reference circuit comprising:

voltage regulator means for generating a positive voltage and a negative voltage corresponding respectively to upper and lower limits of frequency of the received signals;

comparator means including a pair of amplifiers, each amplifier having a first input to receive the voltages proportional to the received signals and a second input for one of said positive and negative voltages from said voltage regulator means; and switch means for generating an output signal isolated from said amplifiers only in response to a DC voltage within the predetermined limits of said positive and negative voltages.

8. In a control circuit according to claim 7, including latch means responsive to said isolated output signal from said switch means indicating reception of said received signals within the predetermined upper and lower limits defined by said voltage regulator means.

9. In a control circuit according to claim 7, including means for selectively adjusting the upper and lower limits of said voltage regulator means.

10. In a control circuit according to claim 8, said adjusting means defined by a pair of potentiometers, one of said potentiometers establishing the upper limit of positive voltage and the other of said potentiometers establishing the lower limit of said negative voltage, each of said potentiometers connected to one of said first inputs of said amplifiers.

11. In a control circuit according to claim 7, said pair of amplifiers interconnected to define an open-loop comparator circuit.

* * * * *